US010037586B2

(12) United States Patent
Ruan

(10) Patent No.: US 10,037,586 B2
(45) Date of Patent: *Jul. 31, 2018

(54) NEGOTIATION PLATFORM IN AN ONLINE ENVIRONMENT

(71) Applicant: EBAY INC., San Jose, CA (US)

(72) Inventor: Angie Ruan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 14/301,211

(22) Filed: Jun. 10, 2014

(65) Prior Publication Data
US 2014/0297542 A1 Oct. 2, 2014

Related U.S. Application Data

(63) Continuation of application No. 12/509,984, filed on Jul. 27, 2009, now Pat. No. 8,799,173.

(51) Int. Cl.
G06Q 30/00 (2012.01)
G06F 17/30 (2006.01)
G06Q 50/18 (2012.01)
G06Q 30/06 (2012.01)
G06Q 30/08 (2012.01)

(52) U.S. Cl.
CPC ....... *G06Q 50/188* (2013.01); *G06Q 30/0601* (2013.01); *G06Q 30/08* (2013.01); *G06Q 30/0619* (2013.01)

(58) Field of Classification Search
CPC .......................... G06Q 50/188; G06Q 30/0601
See application file for complete search history.

(56) References Cited

U.S. PATENT DOCUMENTS

| 6,704,716 | B1 | 3/2004 | Force |
| 7,296,001 | B1 | 11/2007 | Ephrati |
| 7,467,206 | B2 | 12/2008 | Moore et al. |
| 7,653,575 | B2 | 1/2010 | Lin et al. |
| 2002/0103740 | A1 | 8/2002 | Maroney |
| 2004/0122926 | A1 | 6/2004 | Moore et al. |
| 2004/0199575 | A1 | 10/2004 | Geller |
| 2005/0065855 | A1 | 3/2005 | Geller |
| 2007/0061195 | A1 | 3/2007 | Liu et al. |
| 2007/0094092 | A1 | 4/2007 | Lin et al. |

(Continued)

OTHER PUBLICATIONS

"U.S. Appl. No. 12/509,984 , Response filed Jan. 5, 2012 to Non Final Office Action dated Oct. 5, 2011", 14 pgs.

(Continued)

*Primary Examiner* — Kathleen Palavecino
(74) *Attorney, Agent, or Firm* — Schwegman Lundberg & Woessner, P.A.

(57) ABSTRACT

A method and a system for providing a negotiation platform in the event that a listing fails by becoming inactive without the offering being sold are provided. For example, a negotiation eligibility detector may detect a failed listing of an offering. The listing may be associated with a first user and a first offer. A potential buyer detector may identify at least one potential buyer based on a user action associated with the failed listing. A negotiation manager may be in communication with the negotiation eligibility detector and the potential buyer detector. In response to the detecting of the failed listing and the identifying of the potential buyers, the negotiation manager may transmit a request to the at least one potential buyer for a second offer associated with the failed listing.

20 Claims, 6 Drawing Sheets

(56) References Cited

U.S. PATENT DOCUMENTS

2008/0004979 A1   1/2008  Malsbenden
2008/0147534 A1   6/2008  Ephrati et al.
2009/0070216 A1   3/2009  Silvera et al.
2010/0153278 A1   6/2010  Farsedakis
2011/0022523 A1   1/2011  Ruan

OTHER PUBLICATIONS

"U.S. Appl. No. 12/509,984, Response filed Feb. 3, 2014 to Non Final Office Action dated Oct. 1, 2013", 11 pgs.
"U.S. Appl. No. 12/509,984 , Response filed Aug. 7, 2012 to Final Office Action dated Feb. 7, 2012", 12 pgs.
"U.S. Appl. No. 12/509,984, Final Office Action dated Feb. 7, 2012", 18 pgs.
"U.S. Appl. No. 12/509,984, Non Final Office Action dated Oct. 1, 2013", 19 pgs.
"U.S. Appl. No. 12/509,984, Non Final Office Action dated Oct. 5, 2011", 17 pgs.
"U.S. Appl. No. 12/509,984, Notice of Allowance dated Mar. 26, 2014", 5 pgs.

400 ⟶

LISTING IS NO LONGER ACTIVE AND ITEM IS UNSOLD. ARE YOU INTERESTED IN NEGOTIATING WITH USERS WHO ARE INTERESTED IN PURCHASING THIS ITEM?

| YES | NO | LATER |

450 ⟶

LISTING IS NO LONGER ACTIVE AND ITEM IS UNSOLD. ARE YOU INTERESTED IN NEGOTIATING WITH THE SELLER OF THIS ITEM?

| YES | NO | LATER |

PLEASE PROVIDE TERMS OF YOUR NEW OFFER

PRICE: $ [ ]

SHIPPING OPTIONS: ☐ STANDARD ☐ OVERNIGHT
☐ INTERNATIONAL ☐ COURIER

PAYMENT OPTIONS: ☐ CREDIT ☐ CHECK ☐ COD ☐ PAYPAL

OTHER: [ ]

| OK | CANCEL |

*FIG. 5*

NEGOTIATION PLATFORM IN AN ONLINE ENVIRONMENT

RELATED APPLICATION

This application is a continuation of U.S. patent application Ser. No. 12/509,984, filed on Jul. 27, 2009, the benefit of priority of which is claimed hereby, and is incorporated herein by reference in its entirety.

TECHNICAL FIELD

The present application relates generally to the technical field of online publication and, in one specific example, to facilitating a negotiation between two parties.

BACKGROUND

An online publication system typically includes one or more postings or listings that correspond to offerings of goods or services. For example, a listing may include a description of an item and a desired price for the item. The desired price may be a fixed price or, if the listing corresponds to an auction, a reserve price to be met by a first bid in the auction.

Users of an online publication system may be buyers or sellers of the offerings in the listings. Users that are buyers may select a listing for a wish list or a shopping cart but may not actually buy the offering. Other users may watch a listing by visiting the listing repeatedly while the listing remains active.

BRIEF DESCRIPTION OF THE DRAWINGS

Some embodiments are illustrated by way of example and limitation in the figures of the accompanying drawings in which:

FIG. 4 is a set of example user interfaces for determining whether a user is interested in negotiating according to an embodiment.

FIG. 5 is an example of an offer interface for providing an offer according to an embodiment.

DETAILED DESCRIPTION

Example methods and systems to provide a negotiation platform that may be implemented in an online environment are described. In the following description, for purposes of explanation, numerous specific details are set forth in order to provide a thorough understanding of example embodiments. It will be evident, however, to one skilled in the art that the present invention may be practiced without these specific details.

A negotiation platform for identifying negotiation participants and initiating a negotiation session is provided. A negotiation session is typically initiated after an auction or another type of sale results in no buyer having purchased the offering in the listing. One reason offerings may be unsold is the reserve (or minimum) price may be higher than the potential buyers are willing to pay. Listings that are no longer active and that describe unsold offerings are referred to herein as "failed listings."

During an auction, or while the listing is active, one or more users may be identified as being interested in the offering based on, for example, the users viewing the listing of the offering more than once, adding the offering to a wish list, and/or adding the offering to a shopping cart. These users and the seller are contacted to determine if they would consent to making an offer or accepting a lower offer, respectively. If the seller and at least one of the users consent, a "best offer" flow may be initiated between the seller and the user.

By initiating a negotiation between the unsuccessful seller and the interested users, offerings that may not have otherwise been sold may be sold. The online environment itself may benefit from increased traffic and a higher rate of completed transactions. Some benefits may include a more efficient method of determining a fair market price for a one-of-a-kind item, increased knowledge about a user's buying habits, and posting fewer listings that are repeats of earlier listings but having a lesser reserve price.

Platform Architecture

Figure 1:
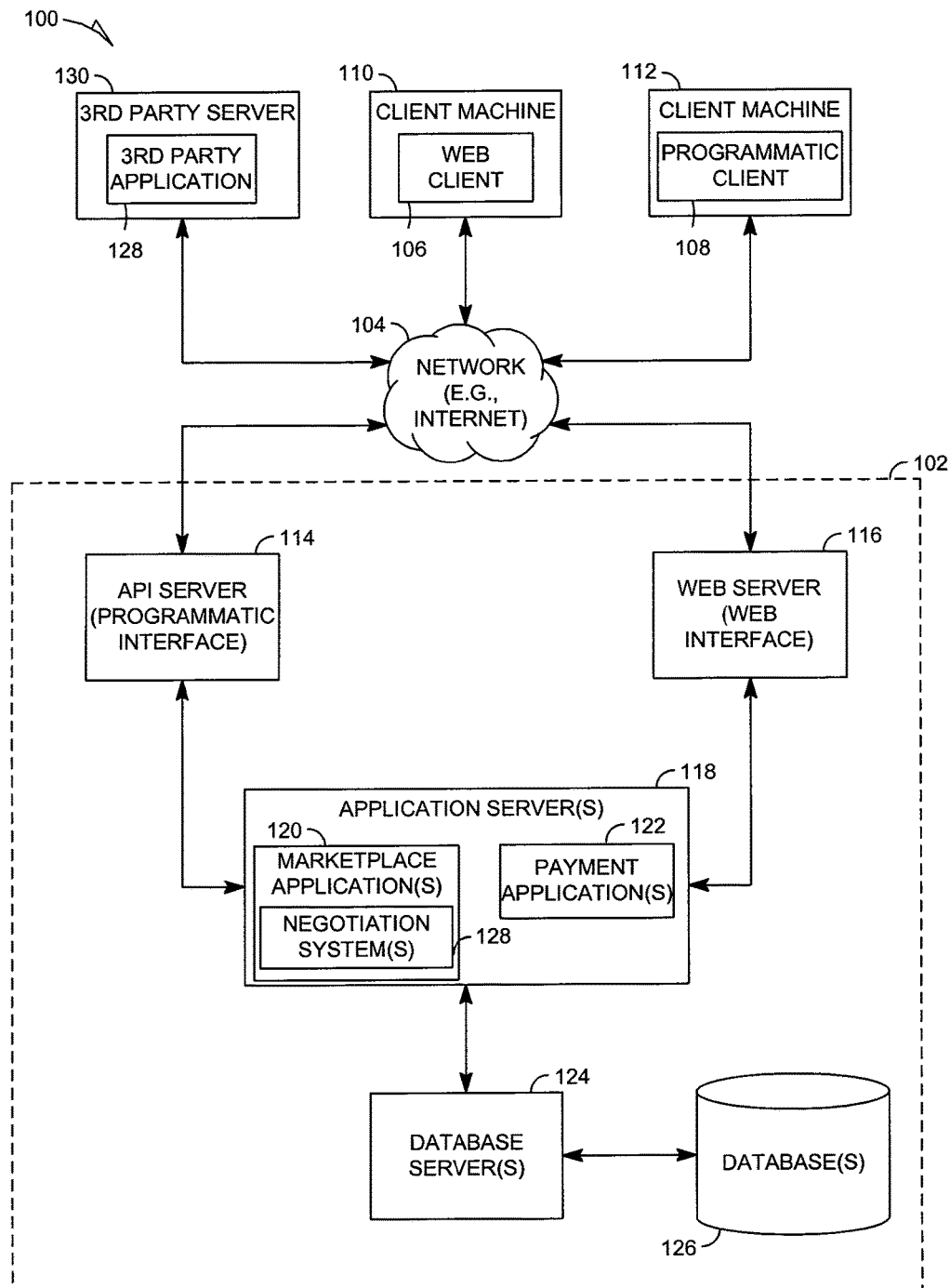
FIG. 1 is a network diagram depicting a client-server system, within which one example embodiment may be deployed.

Some embodiments may be implemented within a client-server system 100 as depicted in the network diagram of FIG. 1 A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then tater to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present disclosure is, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable setters to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

When an offering listed for sale in the marketplace applications 120 does not sell, a negotiation may be initiated between the seller and one or more potential buyers. The offering may be listed as an auction offering or associated with a fixed price. As shown in greater detail in the block diagram of FIG. 2, negotiation systems 128 provide interfaces and/or communications to host a negotiation between a seller and at least one potential buyer. The methods being executed by the negotiation systems 128 may terminate upon a transaction being agreed upon between the seller and one of the potential buyers and/or a determination that no transaction will occur.

After a listing has been published and the selling period has ended without a buyer of the offering in the listing, a negotiation eligibility detector 202 within the negotiation systems 128 may determine that the listing may be eligible for a negotiation. The negotiation eligibility detector 202 may provide an interface to a seller who posted the listing that allows the seller to provide an indication that he/she is willing to negotiate with potential buyers as shown in FIG. 4. In some instances, the interface may be provided to the seller at the time the seller posts the listings and/or when the selling period has ended.

Prior to initiating a negotiation, a potential buyer detector 204 within the negotiation system 128 may, in some instances, communicate with the other applications to identify one or more potential buyers. The potential buyers may be identified based on a user action performed by a potential buyer in connection with the offering. The user action may include, for example, placing the offering or the listing on a wish list. Other systems may record browsing history based on which the negotiation system 128 may determine that the user is a potential buyer. The potential buyer detector 204 may or may not provide an interface to the potential buyer that allows the potential buyer to indicate an interest in negotiating with the seller for the offering identified in the listing as shown in FIG. 4.

A negotiation manager 206 within the negotiations system 128 operates to host or conduct a negotiation between the seller and one or more of the potential buyers. To conduct the negotiation, the negotiation manager 206 may provide an interface (e.g., as shown in FIG. 5) for the potential buyer and/or the seller to provide one or more terms. Examples of terms that may be provided include, but are not limited to, price, discounted or premium shipping, packages including additional offerings (e.g., including additional accessories or a "two-for-the-price-of-one" deal), a modified return policy, concessions, etc.

In some instances, a negotiation interface may comprise a number of options for the potential buyer and/or the seller to provide new terms. For example, the interface may provide options for specifying a price, for text input, checkboxes for selecting from a number of choices (e.g., check boxes for various shipping choices), or the like. In some instances, the negotiation manager 206 may provide only a limited number of options (e.g., only price). The limited options may be selected by the negotiation manager 206, by the seller, and/or by at least one of the potential buyers.

Once an input has been provided by the seller and/or the one or more buyers, the negotiation manager 206 may present the offers provided by the potential buyers to the seller. In some instances, and particularly where the only term being negotiated is price, only the "best offer" (i.e., highest price offered by a potential buyer) may be provided to the seller. In other embodiments, where terms in addition to price are being negotiated, the "best offer" may be selected based on other terms such as shipping preferences, return policy, warranties, payment options (including financing), etc. When a seller receives an offer from one of the potential buyers and accepts the offer, the transaction is complete.

The seller may be able to provide a minimum price, in some embodiments. In these embodiments, only offers that meet or exceed the minimum price are provided to the seller. If no offers are received that meet the minimum price, the seller may be provided with an interface to modify the minimum price.

Flowcharts

Figure 2:
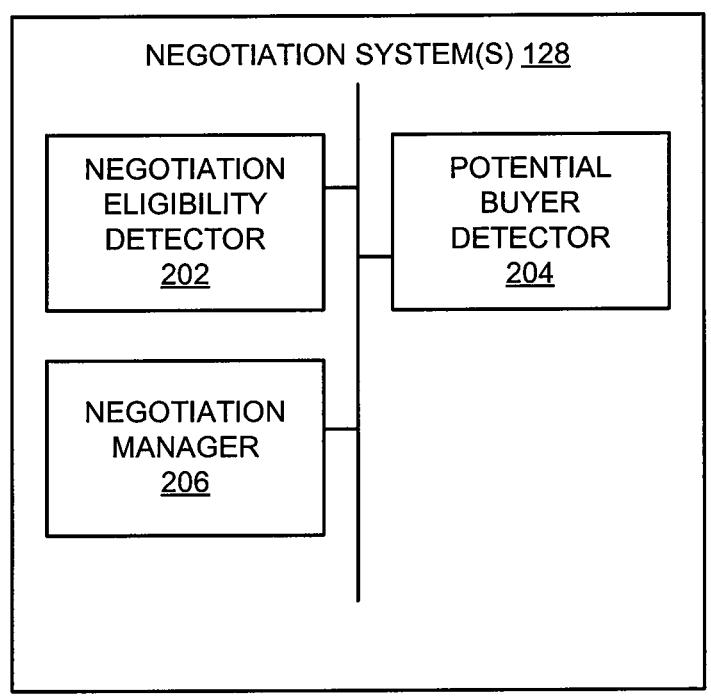
FIG. 2 is a block diagram depicting the negotiation systems that, in one embodiment, are provided as part of the multiple applications.
Figure 3A:
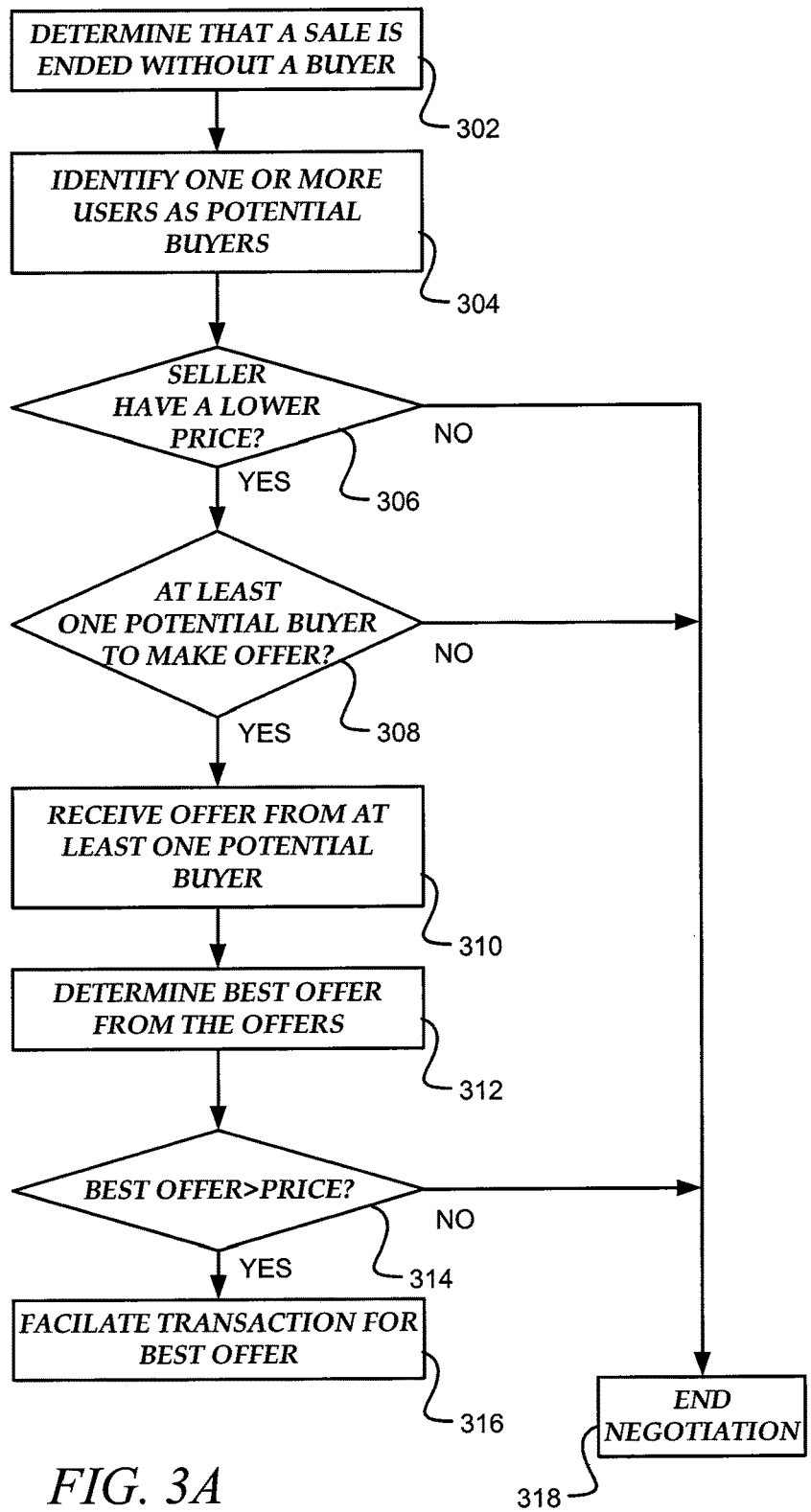
FIG. 3A is a flowchart of an example process for providing a negotiation platform according to various embodiments.

FIG. 3A is a flowchart of an exemplary process 300 for providing a negotiation platform according to various embodiments. The exemplary process 300 may be performed by, for example, the negotiation system 128 of FIG. 2.

In an operation 302, a determination may be made that a sale is ended without a buyer by the negotiation eligibility detector 202 of FIG. 2. The sale may be, for example, an auction listing or a fixed price listing. The determination may be based on an elapsed period of time since the listing was published.

In an operation 304, one or more users may be identified as potential buyers by the potential buyer detector 204 of FIG. 2. The identification may be based on one or more user actions as described above in connection with the potential buyer detector 204.

In an operation 306, a determination is made by the negotiation manager 206 of FIG. 2 that the seller has a lower price that he/she is willing to accept. The determination may be based on input received at the time the listing was initially posted and/or once operation 302 is performed. In some instances, a the number of potential buyers that have been identified may be displayed to the seller, If the seller does not have a lower price, the negotiation is ended in an operation 318.

If the seller does have a lower price, in an operation 308, another determination is made by the negotiation manager 206 that at least one potential buyer is willing to make an offer. If none of the potential buyers are willing to make an offer, the negotiation ends in an operation 318.

If at least one of the potential buyers is willing to make an offer, the process 300 proceeds to operation 310 where at least one offer is received by the negotiation manager 206 from at least one of the potential buyers.

In some embodiments, the operations 306, 308, and 310 includes a time limit during which the seller and/or the potential buyers are allowed to submit offers. The time limit may be a period of hours, days, weeks, or months during which offers can be submitted. The time limit may be measured from when the when the sale ended without a buyer, when the listing was first published, when the seller submit a lower price, when a potential buyer was identified, or upon receipt of a first or subsequent over from a potential buyer. Once the time limit is passed, the negotiation is closed in the operation 318.

In an operation 312, the best offer of the offers may be determined. If the offers include multiple terms, the offers may be provided directly to the seller. In embodiments where the seller has specified a lower price, the best offer may be compared to the lower price in an operation 314. If the best offer is less than the process 300 may end in operation 318, or, in some embodiments, may return to operation 306 to solicit a lower price from the seller (not shown).

In an operation 316, if the best offer meets or exceeds the price or the seller accepts an offer from one of the potential buyers, the transaction is facilitated based on the negotiated terms.

Figure 3B:
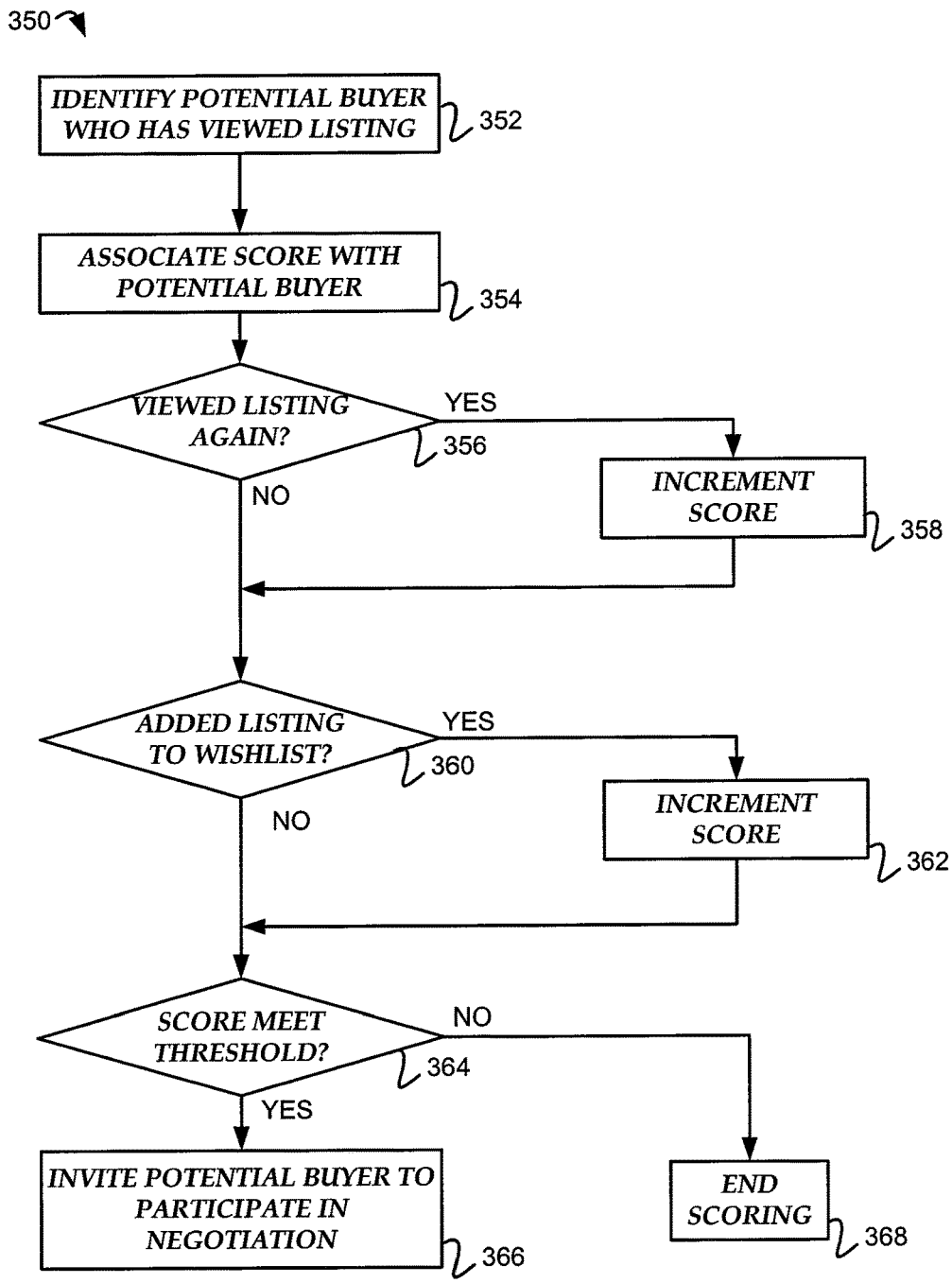
FIG. 3B is a flowchart of an example process tier identifying one or more potential buyers according to various embodiments.

FIG. 3B is a flowchart of an example process 350 for identifying one or more potential buyers according to various embodiments. The process 350 may or may not be performed as part of operation 304 or operation 308 of process 300.

In an operation 352, a potential buyer is identified as a user who has viewed the listing. Some embodiments may use additional or alternative criteria to identify a potential buyer. Once a potential buyer is identified, a score may be associated with the potential buyer in an operation 354. The score may be calculated as the user performs one or more additional user actions associated with the listing or after the sale has ended.

To calculate the score, one or more user actions may be identified. For the purposes of illustration, only two such factors are included in the example process 350. It is understood that fewer or more factors may be considered. In an operation 356, a first factor, whether the user has viewed the listing again, is determined. If the user has viewed the listing again, the score is incremented in the step 358. In some instances, the score may or may not be incremented each time the potential buyer views the listing.

In an operation 360, a second factor, if the potential buyer has added the listing to a wishlist, is considered. If the listing has been added, the score may be incremented in a step 362. In some instances, the second factor may have greater weight than the second factor, or vice versa.

It is noted that some factors may increment and/or decrement the score of the potential buyer. Some factors may be used to screen the potential buyers. For example, a reputation or geographic location of the potential buyer may be considered as a factor. If a user lives in another country, the user's score may be decremented, for example. Further, a reputation score may be used as a multiplier of the user's score. In some instances, the seller may select one or more factors for screening potential buyers.

In an operation 364, a determination is made that the score meets (or exceeds) a threshold. If it does not meet the threshold, the scoring ends in an operation 368. If, however, the score meets the threshold, the potential buyer may be invited to participate in a negotiation in an operation 366.

User Interfaces

FIG. 4 is a set of an example user interfaces for determining whether a user is interested in negotiating according to an embodiment. First interface 400 may be displayed to the seller of the failed listing. The interface 400 may include an option to agree to negotiation, an option to decline negotiation, and/or an option to delay negotiation. The interface 400 may be provided as part of another interface or may be provided by itself (e.g., as a pop-up window). While the depicted interface is specific to instances where the sale has already failed, the interface may be modified to be provided when the listing is created by the seller, during the sale, and/or after the sale has failed. In some instances, the first interface 400 may additionally include a clock that indicates time limit after which no new offers can be submitted.

The second interface 450 may be provided to the potential buyer after the listing has failed and/or upon the occurrence of another event. The second interface 450 may also include a clock indicating a time limit. In some instances, the second interface 450 may be modified if a potential buyer adds the listing to a wishlist or a shopping cart while the sale is still in progress.

FIG. 5 is an example of an offer interface 500 for providing an over according to an embodiment. The offer interface 500 may be provided to the buyer and/or the seller. In some instances, the offer interface 500 may be different for the potential buyers and/or the seller. An offer interface 500 may be modified by the seller to include more or fewer options that can selected by a potential buyer. For example, a seller may wish to restrict the negotiable terms to just price. While options for the terms, "price," "shipping options," payment options" and "other" are shown, it is appreciated that more or fewer options may be provided. In some instances, the offer interface may include an option to set a time limit during which the offer can be accepted or to condition at least on portion of the offer on receiving a reply within a specified time limit. For example, an offer may include a condition that the potential buyer replies within a certain period of time (e.g., 24 hours) to receive free shipping. Further, the terms may be input using features such as, but not limited to, text boxes (including number boxes), checkboxes, radio buttons, and drop-down menus. Further, security features, such as CAPTCHA boxes, may be included in the offer interface 450.

Figure 6:
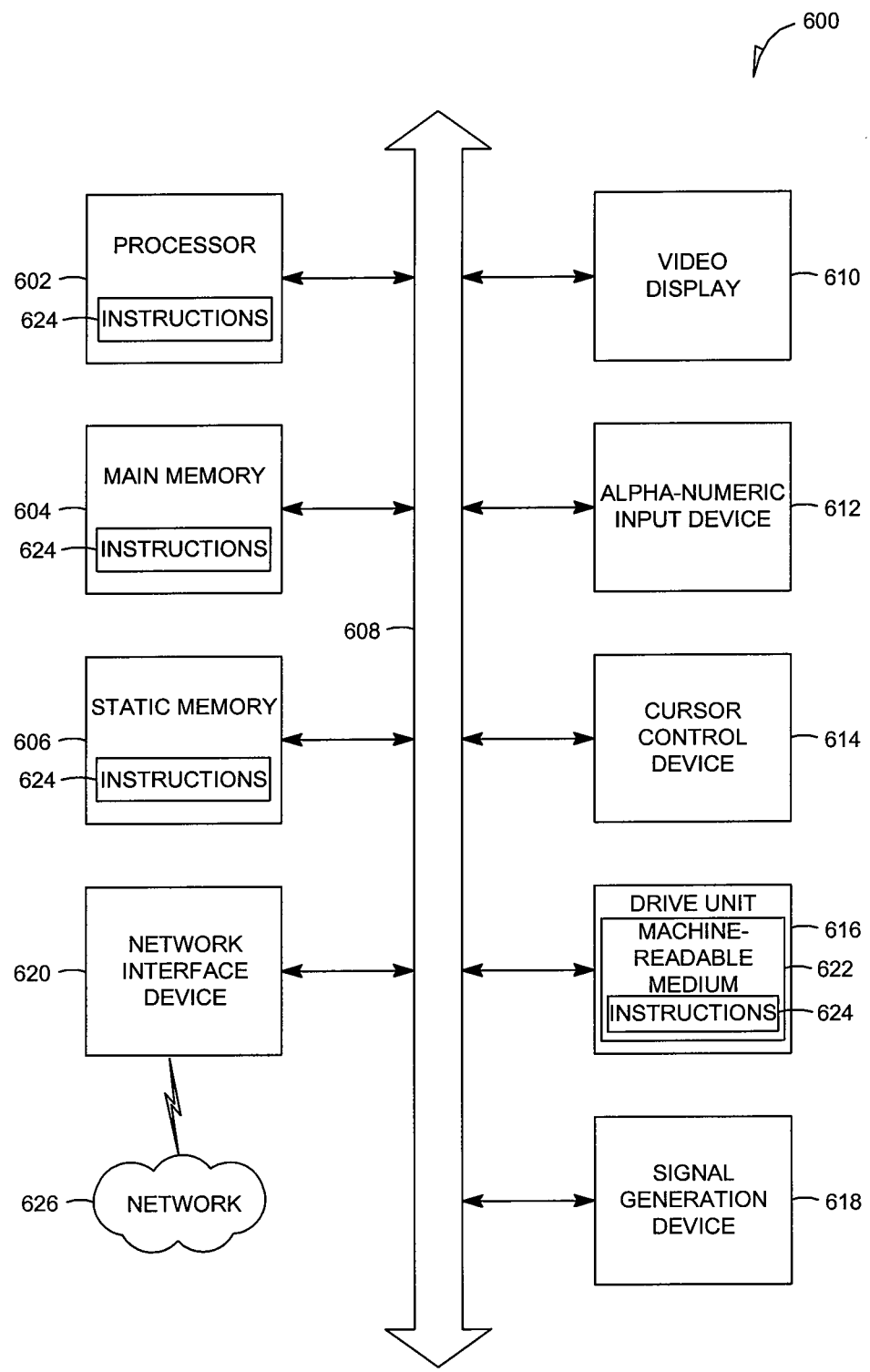
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (FDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)), The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shah also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules (e.g., detectors 202 and 204 and manager 206) may constitute either software modules (e.g., code embodied on a machine-readable medium or in a transmission signal) or hardware modules. A hardware module may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Thus, a method and system to provide a negotiation platform have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a network-based negotiation platform having one or more processors and a memory storing instructions that, when executed by the one or more processors, cause the one or more processors to perform operations comprising:
   detecting, by a negotiation eligibility detector, that a listing associated with a seller is a failed listing;
   identifying, by a potential buyer detector, a user as a potential buyer to participate in a negotiation with the seller regarding the failed listing, the identifying comprising:
      associating a score with the potential buyer,
      incrementing the score with each successive user action performed by the potential buyer with respect to the failed listing, and
      determining that the score meets or exceeds a threshold;
   causing, by a negotiation manager, display of an invitation user interface on a device of the potential buyer, the invitation user interface comprising selectable options to start a negotiation session associated with the failed listing, refuse the negotiation session associated with the failed listing, or delay the negotiation process associated with the failed listing; and
   in response to a selection to start the negotiation session, causing, by the negotiation manager on a device of the seller or the device of the potential buyer, display of an offer interface presenting one or more input features each for receiving a new term in the negotiation session.

2. The system of claim 1, wherein the operations further comprise receiving at least two respective offers, via the offer interface, from at least two respective potential buyers and selecting a best offer from the at least two respective offers.

3. The system of claim 2, wherein the best offer is selected based on a price associated with the listing.

4. The system of claim 2, wherein the operations further comprise transmitting the best offer to the seller.

5. The system of claim 1, wherein the identifying of the potential buyer comprises modifying the score based on a reputation score of the potential buyer, and determining that the modified score meets or exceeds the threshold.

6. The system of claim 1, wherein the identifying of the potential buyer comprises modifying the score based on a geographic location associated with the potential buyer, and determining that the modified score meets or exceeds the threshold.

7. The system of claim 1, wherein the detecting that the listing is the failed listing comprises determining that a reserve price associated with the listing was not met.

8. The system of claim 1, wherein the detecting that the listing is the failed listing comprises determining that a predetermined period of time associated with the listing has elapsed since the listing was published.

9. A method comprising:
   detecting, by a negotiation eligibility detector of a networked-based negotiation platform, that a listing associated with a seller is a failed listing;
   identifying, using one or more hardware processors of a potential buyer detector of the networked-based negotiation platform, a user as a potential buyer to participate in a negotiation with the seller regarding the failed listing, the identifying comprising:
      associating a score with the potential buyer,
      incrementing the score with each successive user action performed by the potential buyer with respect to the failed listing, and
      determining that the score meets or exceeds a threshold;
   causing, by a negotiation manager of the networked-based negotiation platform, display of an invitation user interface to a device of the potential buyer, the invitation user interface comprising selectable options to start the negotiation session, refuse the negotiation session, or delay the negotiation process; and
   in response to a selection to start the negotiation session, causing, by the negotiation manager on a device of the seller or the device of the potential buyer, display of an offer interface presenting one or more input features each for receiving term in the negotiate session.

10. The method of claim 9, further comprising:
   receiving, via the offer interface, a first offer from the potential buyer;
   receiving at least one alternative offer from a second potential buyer;
   determining a best offer based on the first offer and the at least one alternative offer; and
   transmitting the best offer to the seller.

11. The method of claim 9, wherein the one or more input features includes an option to set a time limit for reply.

12. The method of claim 9, wherein the user action comprises selecting the failed listing for later reference, and wherein the selecting of the failed listing for later reference comprises at least one of bookmarking the listing or adding the listing to a wishlist or a shopping cart.

13. The method of claim 9, wherein the user action is setting an alert for changes in the failed listing.

14. The method of claim 9, wherein the identifying of the user as the potential buyer includes modifying the score based on a reputation score of the potential buyer, and determining that the modified score meets or exceeds the threshold.

15. The method of claim 14, wherein the modifying the score comprises using the reputation score as a multiplier of the score.

16. The method of claim 9, wherein the detecting that the listing is the failed listing comprises determining that a predetermined period of time associated with the failed listing has elapsed since the listing was published.

17. The method of claim 9, wherein the user action comprises viewing the failed listing more than once.

18. The method of claim 9, wherein the identifying of the user as the potential buyer comprises modifying the score based on a geographic location associated with the user, and determining that the modified score meets or exceeds the threshold.

19. The method of claim 9, further comprising including a security feature in the offer interface.

20. A non-transitory machine-readable storage medium having embodied thereon instructions that, when executed by one or more processors of a machine, cause the machine to perform operations comprising:

detecting that a listing associated with a seller is a failed listing;

identifying a user as a potential buyer to participate in a negotiation with the seller regarding the failed listing, the identifying comprising:

associating a score with the potential buyer, incrementing the score with each successive user action performed by the potential buyer with respect to the failed listing, and determining that the score meets or exceeds a threshold;

causing display of an invitation user interface to a device of the potential buyer to participate in a negotiation session associated with the failed listing, the invitation user interface comprising selectable options to start the negotiation session, refuse the negotiation session, or delay the negotiation process; and in response to a selection to start the negotiation session, causing, on a device of the seller or the device of the potential buyer, display of an offer interface comprising one or more input features each for receiving a new term in the negotiate session.

\* \* \* \* \*